(12) United States Patent
Gambhir (10) Patent No.: US 11,853,312 B1
(45) Date of Patent: Dec. 26, 2023

(54) GENERATION OF FEATURE STORES

(71) Applicant: Optum, Inc., Minnetonka, MN (US)

(72) Inventor: Harmeet S Gambhir, Gurgaon (IN)

(73) Assignee: OPTUM, INC., Minnetonka, MN (US)

( * ) Notice: Subject to any disclaimer, the term of this patent is extended or adjusted under 35 U.S.C. 154(b) by 38 days.

(21) Appl. No.: 17/808,237

(22) Filed: Jun. 22, 2022

(51) Int. Cl.
*G06F 16/25* (2019.01)

(52) U.S. Cl.
CPC .................................. *G06F 16/25* (2019.01)

(58) Field of Classification Search
CPC ........ G06F 16/25; G06F 16/252; G06F 16/248
See application file for complete search history.

(56) References Cited

U.S. PATENT DOCUMENTS

| | | | |
|---|---|---|---|
| 9,141,662 B2 | 9/2015 | Clark et al. | |
| 9,582,786 B2 | 2/2017 | Gubin et al. | |
| 10,395,321 B2 | 8/2019 | Shalita et al. | |
| 10,474,689 B1 | 11/2019 | Fly et al. | |
| 11,080,283 B1 | 8/2021 | Wondo et al. | |
| 11,244,244 B1 | 2/2022 | Delgado et al. | |
| 2019/0155801 A1* | 5/2019 | Karunanithi | G06F 16/248 |
| 2021/0158073 A1 | 5/2021 | Xie et al. | |
| 2021/0209512 A1 | 7/2021 | Gaddam et al. | |
| 2021/0241171 A1 | 8/2021 | Bonaci et al. | |
| 2021/0279565 A1 | 9/2021 | Akella et al. | |
| 2021/0390702 A1 | 12/2021 | Juillard | |
| 2022/0076164 A1* | 3/2022 | Conort | G06N 20/00 |

OTHER PUBLICATIONS

Amazon, "Amazon SageMaker Feature Store", 14 pp., Retrieved from the Internet on Sep. 16, 2022 from URL: https://aws.amazon.com/sagemaker/feature-store/.
Breck et al., "Data Validation for Machine Learning", MLSys, Apr. 2, 2019, 14 pp., https://proceedings.mlsys.org/book/2019/file/5878a7ab84fb43402106c575658472fa-Paper.pdf.
Osin, "Feature Store as a Foundation for Machine Learning", Towards Date Science, 16 pp., Retrieved from the Internet on Sep. 16, 2022 from URL: https://towardsdatascience.com/feature-store-as-a-foundation-for-machine-learning-d010fc6eb2f3.
Tecton Documentation, "System Requirements", 1 pp., Retrieved from the Internet on Sep. 16, 2022 from URL: https://docs.tecton.ai/v2/setting-up-tecton/01a-system-requirements.html.
Volminger, "A comparison of Data Stores for the Online Feature Store Component: A comparison between NDB and Aerospike", Apr. 25, 2021, 211 pp., https://www.diva-portal.org/smash/get/diva2:1556387/FULLTEXT01.pdf.

* cited by examiner

*Primary Examiner* — Loc Tran
(74) *Attorney, Agent, or Firm* — Shumaker & Sieffert, P.A.

(57) ABSTRACT

A method for generating a feature store comprises receiving an indication of user input indicating a database management system and a server system hosting a target database; and in response to receiving the indication of user input: determining a connection string for the target database; using the connection string to connect to the target database via the database management system; after connecting to the target database, generating a structure of the feature store in the target database; and populating the feature store with predefined feature values.

14 Claims, 7 Drawing Sheets

GENERATION OF FEATURE STORES

TECHNICAL FIELD

This disclosure relates to feature stores.

BACKGROUND

In the context of machine learning, a feature may be measurable data that can be used as input to a machine learning model. For example, features used in machine learning model for identifying a medical condition may include data indicating a patient's body temperature, data indicating the presence or absence of particular symptoms, an age of the patient, and so on. A feature store is a system for storing features that may be used in a machine learning model. Features in a feature store may be used for training a machine learning model or may be used when applying a machine learning model to make predictions.

SUMMARY

This disclosure describes techniques for generation of feature stores. As described herein, a computing system may receive an indication of user input. The indication of user input may indicate both a database management system and a server system. The server system may host a target database. In response to receiving the indication of user input, the computing system may automatically generate a feature store in the target database without additional user input. As part of generating the feature store, the computing system may determine a connection string for the target database. The computing system may connect to the target database via the database management system using the connection string. After connecting to the target database, the computing system may generate a structure of the feature store in the target database. The computing system may populate the feature store with predefined feature values.

In one aspect, this disclosure describes a method for generating a feature store, the method comprising: receiving, by processing circuitry of a computing system, an indication of user input, the indication of the user input indicating both a database management system and a server system, the server system hosting a target database; and in response to receiving the indication of user input: determining, by the processing circuitry, a connection string for the target database; connecting, by the processing circuitry, to the target database via the database management system using the connection string; after connecting to the target database, generating, by the processing circuitry, a structure of the feature store in the target database; and populating, by the processing circuitry, the feature store with predefined feature values.

In another example, this disclosure describes a system comprising: a target database; and a computing system comprising processing circuitry, wherein the processing circuitry is configured to: receive an indication of user input, the indication of user input indicating both a database management system and a server system, the server system hosting the target database; and in response to receiving the indication of user input: determine a connection string for the target database; connect to the target database via the database management system using the connection string; after connecting to the target database, generate a structure of a feature store in the target database; and populate the feature store with predefined feature values.

In another example, this disclosure describes a non-transitory computer-readable storage medium having instructions stored thereon that, when executed, cause processing circuitry to: receive an indication of user input, the indication of the user input indicating both a database management system and a server system, the server system hosting a target database; and in response to receiving the indication of user input: determine a connection string for the target database; connect to the target database via the database management system using the connection string; after connecting to the target database, generate a structure of a feature store in the target database; and populate the feature store with predefined feature values.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

When developing a machine learning model for a specific purpose, a data scientist may select which features will serve as input to the machine learning model. For example, if the data scientist is developing a machine learning model for identifying a medical condition, the data scientist may select features that correspond to a first set of symptoms and exclude features that correspond to a second set of symptoms. The data scientist may then create a feature store to store values of the selected features (i.e., feature values). Creating the feature store may involve developing a database schema specifically for storage of the selected features. The data scientist may then populate feature values into the feature store. For instance, the data scientist may use data from one or more separate data sources to populate feature values into the feature store. Creation of feature stores for individual machine learning projects may be time consuming.

This disclosure describes techniques that may automate the generation of feature stores. As described in this disclosure, a computing system may receive an indication of user input. The indication of user input may indicate a database management system and a server system. The server system hosts a target database. In response to receiving the indication of user input, the computing system may determine a connection string for the target database. The computing system may use the connection string to connect to the target database via the database management system. After connecting to the target database, the computing system may generate a structure of the feature store in the target database. The computing system may then populate the feature store with predefined feature values. This process may accelerate the generation of feature stores, potentially allowing computing systems to work faster and more efficiently. Furthermore, determining the connection string for the target database may address problems associated with the processing system not being preconfigured with a connection string needed to connect to databases managed by a database management system that manages the target database.

Figure 1:
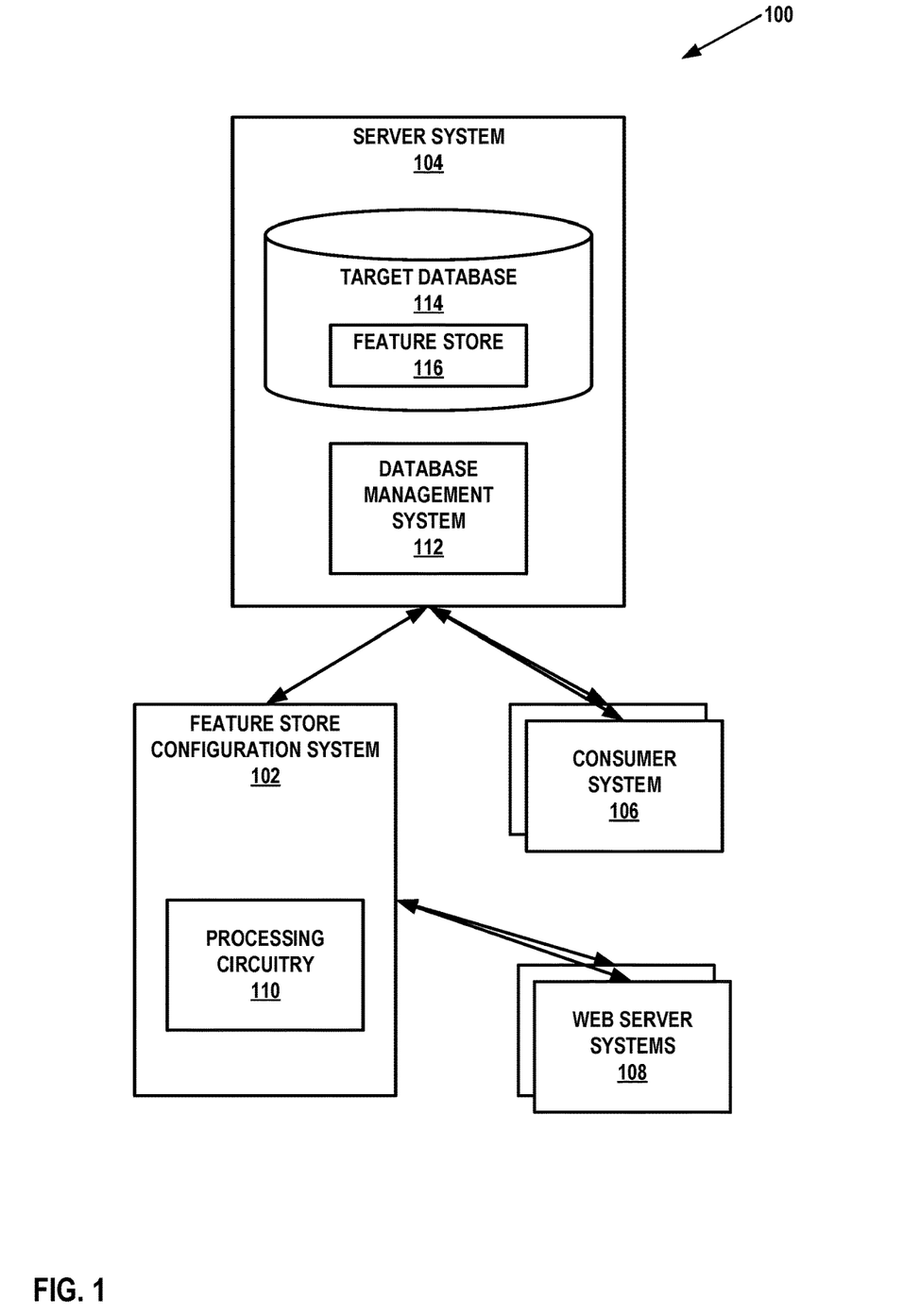
FIG. 1 is a block diagram illustrating an example system in accordance with one or more aspects of this disclosure.

FIG. 1 is a block diagram illustrating an example system 100 in accordance with one or more aspects of this disclosure. In the example of FIG. 1, system 100 includes a feature store configuration system (FSCS) 102, a server system 104, one or more consumer systems 106, and one or more web server systems 108. In other examples, system 100 may include more, fewer, or different systems. FSCS 102, server system 104, consumer systems 106, and web server systems 108 may communicate via one or more communication networks, such as the Internet. FSCS 102 may be a computing system comprising one or more computing devices.

Each of FSCS 102, server system 104, consumer systems 106, and web server systems 108 may comprise processing circuitry. The processing circuitry may include one or more microprocessors, application-specific integrated circuits (ASICs), field-programmable gate arrays (FPGAs), or other types of processing circuits. In the example of FIG. 1, FSCS 102 includes processing circuitry 110. Processing circuitry 110 may be distributed among one or more devices of FSCS 102. The devices of FSCS 102 may include laptop computers, desktop computers, mobile devices (e.g., mobile phones or tablets), server computers, or other types of devices. This disclosure may describe processing tasks performed by processing circuitry 110 as being performed by FSCS 102.

In machine learning, a feature is a type of data used as an input signal to a predictive machine learning (ML) model. For example, if a credit card company is trying to predict whether a transaction is fraudulent, a useful feature might be whether the transaction is happening in a foreign country. In this example, a feature value may indicate that a specific transaction actually happened in a foreign country. A ML model may have an input neuron for receiving the feature indicating whether a transaction is happening in a foreign country. When the ML model is used, a feature value that indicates that the specific transaction happened in the foreign country is provided to the input neuron of the ML model. Similar examples in healthcare may include clinical features like age, gender, each diagnostic code in a claim, etc. A "feature store" is what is used to store and manage such feature values. The feature store can be used as a source for training data for a ML model or as a source of input data to a machine learning model.

The techniques of this disclosure may reduce the difficulty of building a feature store. For instance, in accordance with this technology, FCSC 102 may interact with a database management system 112 running on server system 102 to create an empty database (i.e., target database 114) to store a feature store 116. Target database 114 may be compatible with a specific database management system and may be hosted by a specific server. Examples of database management systems may include Oracle, PostGre, TigerGraph, and so on. Target database 114 may be a relational database or a graph database. If target database 114 is a relational database, target database 114 does not, at this stage, include any tables. If target database 114 is a graph database, target database 114 does not, at this stage, include any nodes or edges.

When a user wants to create feature store 116 in target database 114, FSCS 102 may receive an indication of user input indicating the database management system (e.g., database management system 112) compatible with the feature store database. FSCS 102 may also receive indications of user input indicating a server name of the server (e.g., server system 104) that hosts the target database 114. FSCS 102 may also receive indications of user input of authentication credentials (e.g., a username and a password) to connect to target database 114.

A database connection string is a string that specifies information about a database and the means of connecting to the database. Differently formatted connection strings may be needed to connect to databases managed by different database management systems. For example, different database management systems may require different numbers of elements or elements that are in different orders. Example elements of a connection string may include a driver element, a server element, an element indicating whether a Secure Socket Layer (SSL) protocol is used, a SSL mode, a database name, a user identifier, a connection timeout element, a password element, and so on. Because there may be many different database management systems, and because database management systems can evolve to include different connection string requirements, FSCS 102 might not be preconfigured with a format of a connection string for connecting to a database managed by the database management system indicated by the user. Nevertheless, FSCS 102 may need a connection string in order to access a database to configure target database 114, to store data into target database 114, and to retrieve data from target database 114.

To address the problem of FSCS 102 not being preconfigured with a format of a connection string needed to connect to databases managed by the database management system indicated by the user, FSCS 102 may include a web crawler program that scans the Internet to identify webpages hosted by web servers 108 that contain predefined keywords. Webpages that contain the predefined keywords are likely to include database connection strings. The system may analyze the webpages for connection strings that indicate the database management system. The connection strings may be included in the Uniform Resource Locators (URLs) and/or Hypertext Markup Language (HTML) of the webpages.

FSCS 102 may rank the webpages having database connection strings that indicate the database management system. In general, webpages in which the database connection strings include more parameters are ranked higher than webpages in which the database connection strings include fewer parameters. FSCS 102 may use the format of the database connection string in the highest-ranked webpage to generate a connection string to connect to target database 114. If FSCS 102 is unable to connect to target database 114 using the generated connection string, FSCS 102 may try again using a connection string having the database connection string format used in the next highest ranked webpage, and so on.

After determining a database connection string that is usable to connect to target database 114, FSCS 102 may send commands to the indicated database management system 112 to create a data model for feature store 116 in target database 114. For example, if target database 114 is a relational database, FSCS 102 may send commands to database management system 112 to create a predefined set of tables in target database 114. The tables may include a feature master table that stores information defining features, such as names of features, descriptions of features, default values of features, and so on. A feature value table may store data indicating individual feature values of the features defined in the feature master table. Other tables may include information about a version of the feature store. In some examples, FSCS 102 may determine the features based on column names of tables of a relational database that stores predefined (i.e., existing) data.

Furthermore, FSCS 102 may populate the tables in target database 114 with predefined feature values. FSCS 102 may use different sets of predefined feature values for different industries. For example, FSCS 102 may populate the tables in target database 114 with one of: a first set of predefined feature values for healthcare, a second set of predefined feature values for astronomy, and so on. The sets of predefined feature values may be based on actual observed data for an industry.

In examples where the database type of the selected database management system 112 is a graph database, FSCS 102 may command the selected database management system 112 to support a predefined set of node and edge types. FSCS 102 may then command the selected database management system to create a predefined set of nodes and edges representing a set of predefined features.

The system may use a machine-learned generator model to generate more feature values to include in the feature set database. The generator model may be trained as part of a Generative Adversarial Network (GAN) based on predefined features for an industry. Inclusion of features generated by the generator model in the feature store database may increase the number of features available in feature store 116. In other words, FSCS 102 may apply a generator model to generate synthetic feature values, wherein the generator model is trained using a GAN. FSCS 102 may populate the synthetic feature values into feature store 116. Increasing the number of features available in feature store 116 may allow for better training of ML models that use the features in feature store 116 as training data. In examples where the database type of the selected database management system 112 is a graph database, FSCS 102 may convert the tabular data generated by the generator model into graph data and command database management system 112 to include the graph data in feature store 116.

Consumer systems 106 may use features in feature store 116. For example, consumer systems 106 may train one or more ML models based on features in feature store 116. For instance, consumer system 106 may use the features, along with expected output values, to train neural network models. In some examples, consumer system 106 may use the feature values in an unsupervised learning process, such as a k-means clustering model. In some examples, consumer systems 106 may apply one or more ML models to features in feature store 116 to generate predictions. The ML models may include neural network models, regression models, clustering models, and so on.

Figure 2:
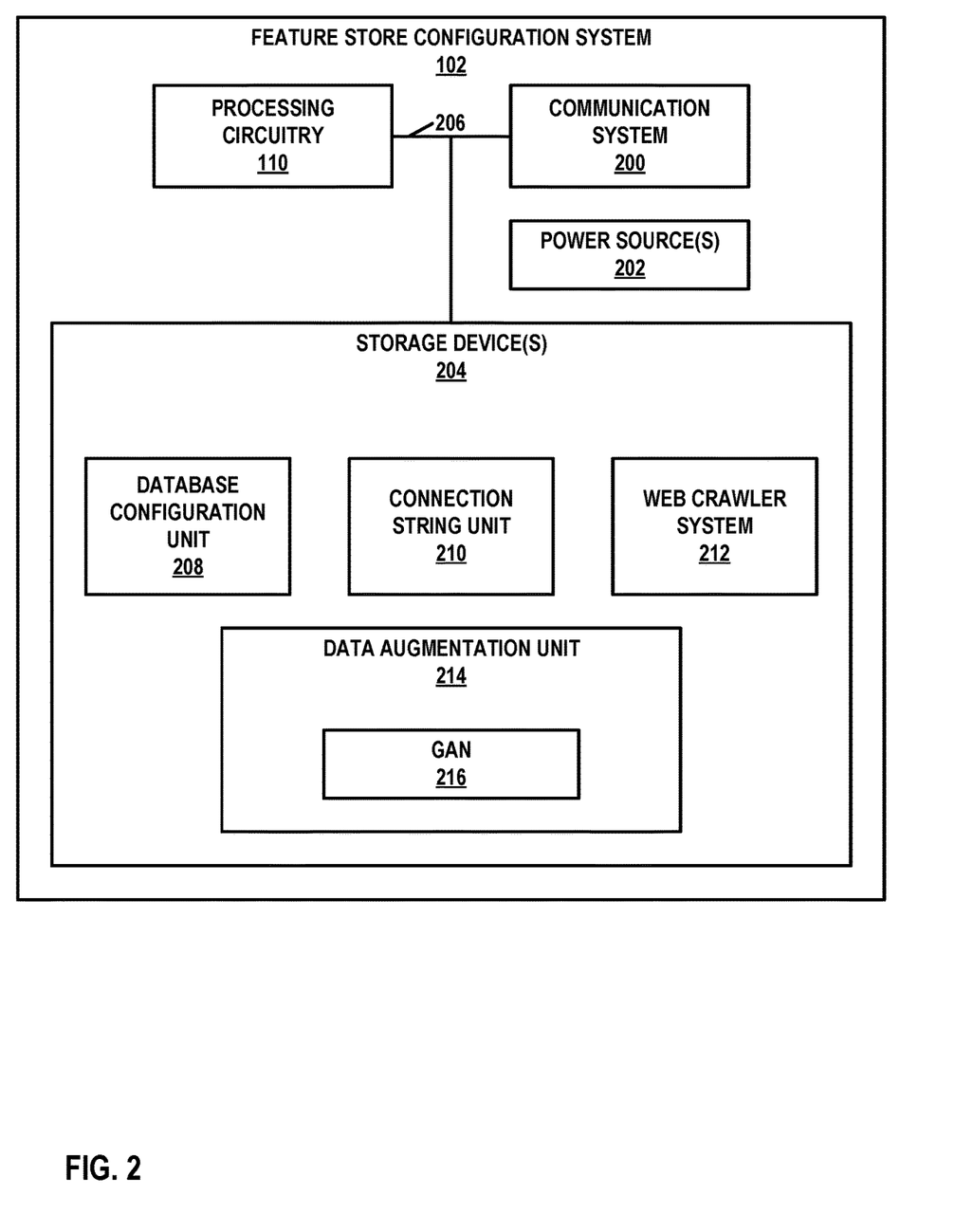
FIG. 2 is a block diagram illustrating an example computing system in accordance with one or more aspects of this disclosure.

FIG. 2 is a block diagram illustrating example components of FSCS 102 in accordance with one or more aspects of this disclosure. In the example of FIG. 2, FSCS 102 includes processing circuitry 110, a communication system 200, one or more power sources 202, and one or more storage devices 204. Communication channel(s) 206 may interconnect components of FSCS 102 for inter-component communications (physically, communicatively, and/or operatively). In some examples, communication channel(s) 206 may include a system bus, a network connection, an inter-process communication data structure, or any other method for communicating data. Power source(s) 202 may provide electrical energy to processing circuitry 110, communication system 200, and storage device(s) 204. Storage device(s) 204 may store information required for use during operation of FSCS 102.

Processing circuitry 110 comprises circuitry configured to perform processing functions. For instance, processing circuitry 110 may include one or more microprocessors, application-specific integrated circuits (ASICs), field-programmable gate arrays (FPGAs), or other types of processing circuits. Processing circuitry 110 may include programmable and/or fixed-function circuitry. In some examples, processing circuitry 110 may read and may execute instructions stored by storage device(s) 204.

Communication system 200 may enable FSCS 102 to send data to and receive data from one or more other devices, such as server system 104, web server systems 108, and so on. Communication system 200 may include radio frequency transceivers, or other types of devices that are able to send and receive information. In some examples, communication system 200 may include one or more network interface cards or other devices for cable-based communication.

Storage device(s) 204 may store data. Storage device(s) 204 may include volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 204 may include non-volatile memory for long-term storage of information and may retain information after power on/off cycles. Examples of non-volatile memory may include flash memories or forms of electrically programmable memories (EPROM) or electrically erasable and programmable (EEPROM) memories.

In the example of FIG. 2, storage device(s) 204 store instructions associated with a database configuration unit (DCU) 208, a connection string unit 210, a web crawler system 212, and a data augmentation unit 214. Processing circuitry 110 may execute the instructions associated with a database configuration unit 208, a connection string unit 210, a web crawler system 212, and a data augmentation unit 214. For ease of explanation, this disclosure describes actions performed by processing circuitry 110 when executing instructions associated with a database configuration unit 208, a connection string unit 210, a web crawler system 212, and a data augmentation unit 214 as being performed by a database configuration unit 208, a connection string unit 210, a web crawler system 212, and a data augmentation unit 214.

DCU 208 may receive indications of user input to initiate a process to create a feature store, such as feature store 116 (FIG. 1). For instance, DCU 208 may receive an indication of user input specifying a server name of a server, such as server system 104, and a type of database management system to manage to a database that stores the feature store. Different database management systems may manage different types of databases. For instance, some database management systems may manage relational databases. Other database management systems may manage graph databases, and so on. In some examples, DCU 208 may receive indications of user input to indicate user credentials and potentially other information. In some examples, DCU 208 may receive indications of user input that indicate a source of feature values to include in the feature store.

In some examples, DCU 208 may output a user interface for display that includes features (e.g., text boxes, drop boxes, etc.) for entry of the server name, type of database management system, user credentials, and/or other information to be provided by the user. The user interface may include a submission button. DCU 208 may perform the process of creating a feature store in response to receiving an indication of user selection of the submission button. Thus, in some examples, from the perspective of the user, all the user needs to do to create a populated feature store is to input the information in the user interface and click the submission button. Thus, from the perspective of the user, the techniques of this disclosure may be a "no code" solution for generating feature stores.

In response to receiving the indication of user input, connection string unit 210 may determine a connection string for the target database (e.g., target database 114). Connection string unit 210 may use data generated by web crawler system 212 to determine the connection string for the target database. Web crawler system 212 may scrape webpages for connection strings. Scraping webpages for connection strings may involve automatically following hyperlinks in webpages to access other webpages and extracting information from the accessed webpages. The extracted information may include connection strings. Web crawler system 212 may extract the connection strings from Uniform Resource Locators (URLs) of webpages or URLs indicated in webpages. In some examples, web crawler system 212 may extract the connection strings from other portions of the webpages, such as Hypertext Markup Language (HTML) content of the webpages, client-side scripting code of the webpages, and so on. In some examples, web crawler system 212 may apply regular expression processing to determine connection strings in URLs or content of webpages.

Connection string unit 210 may rank the webpages that include connection strings based on a set of predefined criteria. For instance, connection string unit 210 may rank the webpages based on a set of predefined keywords. In some examples, connection string unit 210 may rank the webpages based on numbers of elements included in the connection strings included in the webpages. Connection string formats often evolve to include more elements, so connection strings with more elements are likely to be more current, and therefore may be ranked higher.

Connection string unit 210 may process webpages according to the ranking of the webpages. For instance, connection string unit 210 may process a connection string included in a highest ranked webpage first, followed by a connection string included in a second highest ranked webpage, followed by a connection string included in a third highest ranked webpage, and so on. When connection string unit 210 processes a connection string included in a webpage, connection string unit 210 may prepare a trial connection string based on a format of the connection string included in the webpage. For example, as part of preparing the trial connection string, connection string unit 210 may substitute a server name, user credentials, and/or other data specified by the user into corresponding fields of the connection string included in the webpage.

Connection string unit 210 may then perform an attempt to use the trial connection string to connect to target database 114 via database management system 112. If the trial connection string does not have the correct format for connecting to target database 114, the attempt is unsuccessful. However, if the trial connection string has the correct format for connecting to target database 114, and other information included in the trial connection string is correct, the attempt may be successful. If the attempt to use the trial connection string to connect to target database 114 is unsuccessful, connection string unit 210 may attempt to use another connection string to connect to target database 114. For instance, connection string unit 210 may process a connection string included in a next highest ranked webpage. If connection string unit 210 is unable to connect to target database 114 using any trial connection string, connection string unit 210 may cause FSCS 102 to output an error message to the user.

If the attempt is successful, connection string unit 210 may save the format of the trial connection string for future use. In some examples, before processing connection strings included in webpages, connection string unit 210 may attempt to connect to target database 114 using trial connection strings based on saved formats of connection strings that have been successfully used to connect to databases.

After connection string unit 210 determines a connection string that can be used to connect to target database 114, DCU 208 may send commands to database management system 112 to configure target database 114 to generate a structure of feature store 116 in target database 114. For example, when target database 114 is a relational database, DCU 208 may send commands to create a set of tables in target database 114 to contain feature store 116. In some examples, where target database 114 is a graph database, DCU 208 may send commands to generate a set of basic nodes and edges for storing feature store 116.

After generating a structure of feature store 116 in target database 114, DCU 208 may populate predefined feature values into feature store 116. For instance, DCU 208 may copy data from an existing database into feature store 116.

Table 1, below, shows an example set of features that may be stored in feature store 116.

TABLE 1

| Transaction_id | in_foreign_country | size_compared_to_avg_transaction | fraud? |
|---|---|---|---|
| 7485 | False | 0.8x | False |
| 46854 | True | 21.2x | True |
| 3521 | True | 1.1x | False |

In the example of Table 1, each of the columns corresponds to a different "feature." The term "feature value" refers to a single value of a feature column. In an example related to healthcare, features may include clinical features, age, gender, diagnostic codes, and so on.

In some instances, even after populating the predefined feature values into feature store 116, feature store 116 does not include sufficient feature values for the user's purposes. For instance, feature store 116 might not include sufficient data to train a machine learning model. To address this problem, data augmentation unit 214 may automatically generate synthetic feature values in feature store 116. The synthetic feature values are feature values that are not included in the set of predefined feature values but are realistic variations on the set of predefined feature values. For example, the synthetic feature values may include or may be based on medical records for imaginary patients, transaction records for imaginary credit card transactions, and so on.

In some examples, data augmentation unit 214 uses a GAN 216 to generate the synthetic feature values. Data augmentation unit 214 may populate the synthetic feature values into feature store 116. As described in greater detail below, GAN 216 may include a generator model and a discriminator model. Each of the generator model and discriminator model are machine learning models. The generator model may generate synthetic feature values based on random input data. The discriminator model generates predictions indicating whether feature values provided as input to the discriminator are synthetic feature values generated by the generator model or are real feature value. If the discriminator model correctly determines that the generator model generated an input feature, data augmentation unit 214 may update the generator model to improve the ability of the generator model to generate realistic synthetic feature values. If the discriminator model incorrectly determined that the generator model generated the input feature values, data augmentation unit 214 may update the discriminator model to improve the ability of the discriminator model to distinguish between feature values generated by the generator model and real feature values.

Figure 3:
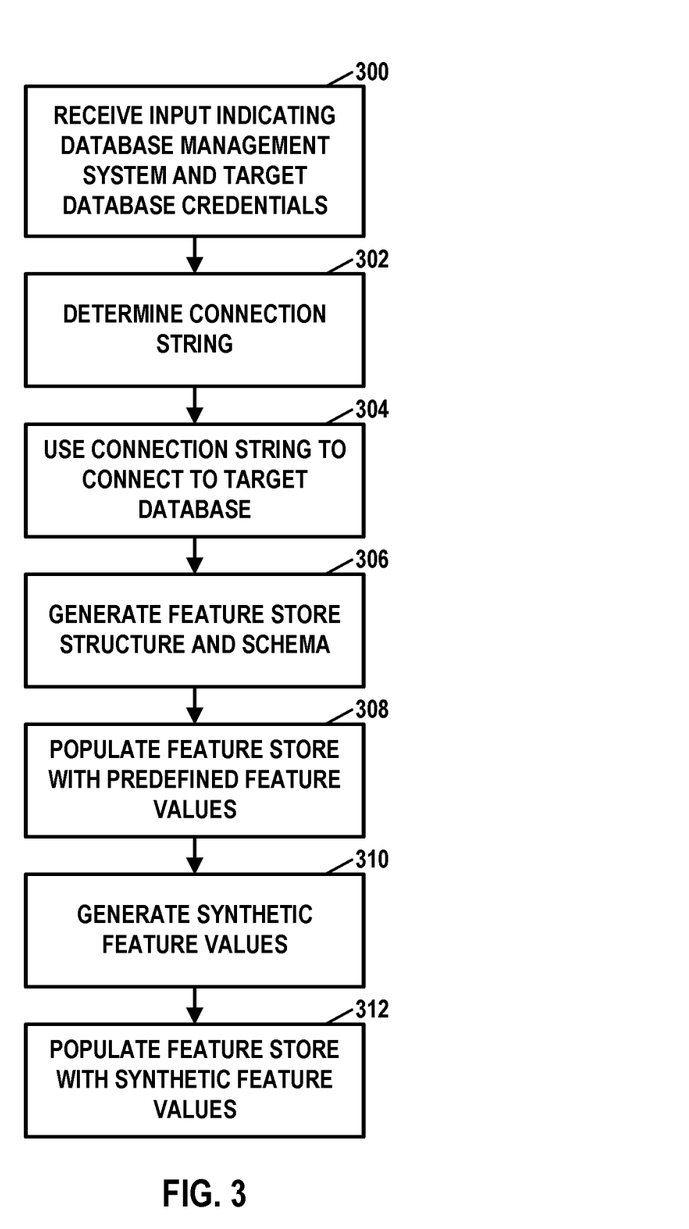
FIG. 3 is a flowchart illustrating an example operation of a feature store configuration system in accordance with one or more aspects of this disclosure.

FIG. 3 is a flowchart illustrating an example operation of FSCS 102 in accordance with one or more aspects of this disclosure. The example of FIG. 3 is described with reference to FIG. 1 and FIG. 2, however, the operation is not so limited. The flowcharts of this disclosure are provided as examples. In other examples in accordance with the techniques of this disclosure, operations may include more, fewer, or different actions.

In the example of FIG. 3, DCU 208 of FSCS 102 may receive an indication of user input indicating a database management system (e.g., database management system 112) and a server system (300). The server system hosts a target database. In response to receiving the indication of user input, connection string unit 210 may determine a connection string for target database 114 (302). DCU 208 may connect to target database 114 via database management system 112 using the connection string (304). In some examples, DCU 208 may receive an indication of user input indicating user credentials for the target database and, as part of using the connection string to connect to target database 114, DCU 208 may provide the user credentials to database management system 112 that manages target database 114.

After connecting to target database 114, DCU 208 may generate a structure of feature store 116 in target database 114 (306). In some examples, DCU 208 may use predefined logic (e.g., a script) to generate the structure of feature store 116 in target database 114. In some examples, DCU 208 may generate the structure of feature store 116 by sending commands to database management system 112 to generate a set of tables in target database 114 or a set of node and edge types in target database 114. In some examples where target database 114 is a graph database, DCU 208 may, as part of generating the structure of feature store 116, add feature master nodes to the graph database, where each of the feature master nodes contains information defining a feature of the feature store.

DCU 208 may populate the feature store with predefined feature values (308). For example, DCU 208 may obtain the predefined feature values from an existing database. For instance, DCU 208 may execute a query to obtain the feature values from the existing database. The query may join data from multiple tables and/or transform data in the existing database in one or more ways to form the predefined feature values. DCU 208 may issue one or more commands to database management system 112 to instruct database management system 112 to store the predefined feature values in feature store 116. In some examples where target database 114 is a relational database, DCU 208 may add rows to one or more tables of the relational database to store the predefined feature values. In some examples where target database 114 is a graph database, DCU 208 may add feature value nodes to the feature store and edges that connect the feature value nodes to the feature master nodes, wherein each of the feature value nodes contains information defining a feature value of the predefined feature values.

Furthermore, in the example of FIG. 3, data augmentation unit 214 may generate synthetic feature values (310). For instance, data augmentation unit 214 may use a generator of GAN 216 to generate the synthetic feature values as described elsewhere in this disclosure. Data augmentation unit 214 may populate feature store 116 with the synthetic feature values (312). For instance, data augmentation unit 214 may issue commands to database management system 112 to store the synthetic feature values in feature store 116. In examples where target database 114 is a graph database, data augmentation unit 214 or database management system 112 converts the synthetic feature values into a set of nodes and edges for storage in feature store 116.

Thus, in the example of FIG. 3, FSCS 102 may scrape webpages for connection strings for databases managed by the database management system, extract database type details from URLs of the webpages, prepare a trial connection string based on a format of a webpage, wherein the webpage is one of the webpages, and perform an attempt to use the trial connection string to connect to the target database. Based on the attempt to use the trial connection string to connect to the target database being unsuccessful, FSCS 102 may perform an attempt to use another connection string to connect to the target database. In some examples, FSCS 102 may prepare a second trial connection string based on a format of a second webpage, wherein the second webpage is one of the webpages. FSCS 102 may perform an attempt to use the second trial connection string to connect to the target database. Based on the attempt to use the second trial connection string to connect to the target database being successful, FSCS 102 may determine that the second trial connection string is the connection string for the target database.

Figure 4:
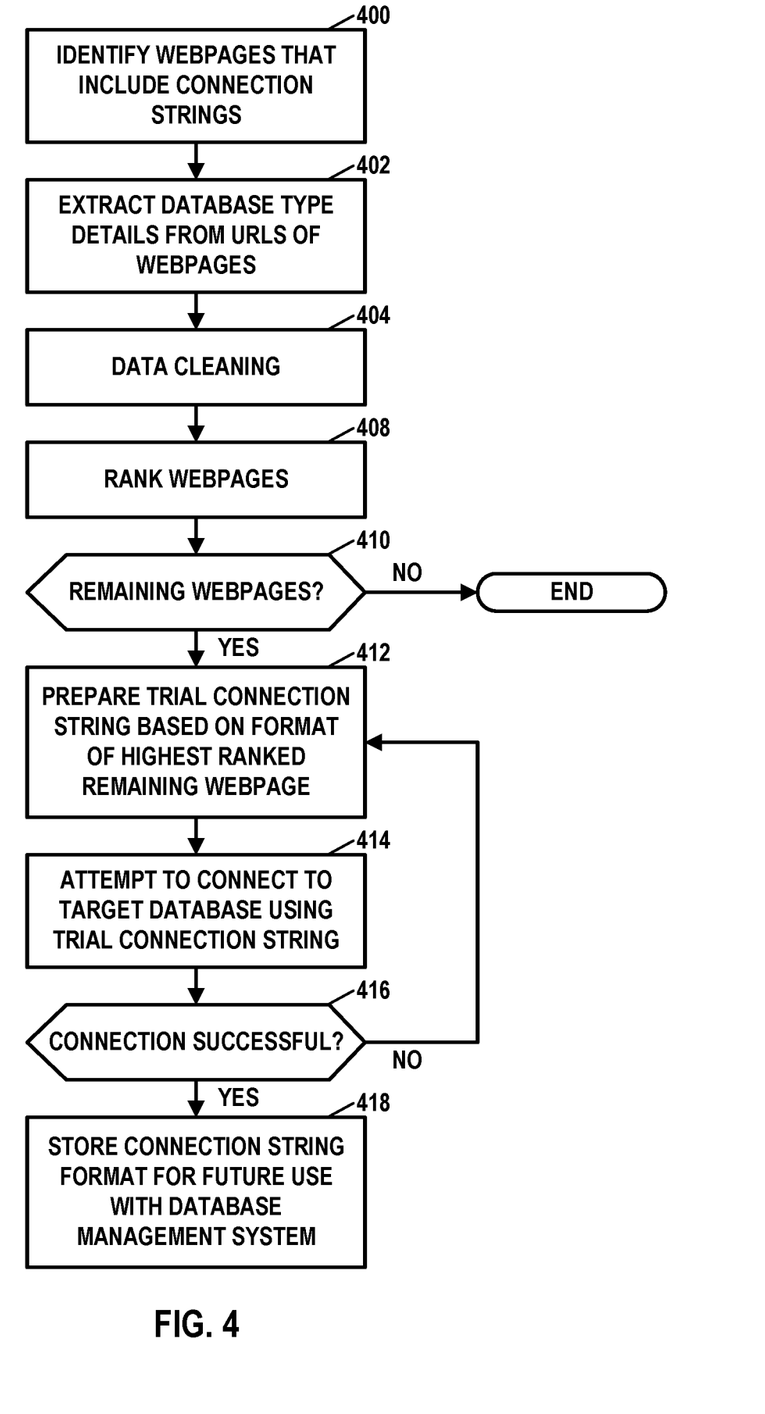
FIG. 4 is a flowchart illustrating an example operation of a connection string unit, in accordance with one or more aspects of this disclosure.

FIG. 4 is a flowchart illustrating an example operation of connection string unit 210, in accordance with one or more aspects of this disclosure. FIG. 4 is described with respect to FIGS. 1-3, but the operation of FIG. 4 is not so limited. In the example of FIG. 4, connection string unit 210 may use web crawler system 212 identify webpages that include connection strings (400). In other words, connection string unit 210 may scrape a network (e.g., the Internet, a local area network, etc.) for webpages that include connection strings. In some examples, web crawler system 212 may be implemented using a BeautifulSoup or WebScraperAPI tool.

Additionally, connection string unit 210 may extract database type details from URLs of webpages (402). For example, connection string unit 210 may identify elements of connection strings and the order of elements in the connection strings.

Connection string unit 210 may then perform data cleaning (404). For example, connection string unit 210 may exclude webpages that do not satisfy a specific set of criteria. In some examples, data cleaning may include removing unnecessary spaces, tabs, unwanted information, information that is not required, and so on.

Furthermore, connection string unit 210 may rank the webpages (406). For example, connection string unit 210 may rank the webpages based on the number of elements in the connection strings of the webpages. In some examples, connection string unit 210 may rank the webpages based on the presence and number of keywords in the webpages.

Connection string unit 210 may determine whether there are any remaining webpages (408). Connection string unit 210 may determine that there are no remaining webpages when connection string unit 210 has processed each of the webpages identified as including connection strings. If there are no remaining webpages ("NO" branch of 408), connection string unit 210 may end the process of determining a connection string for target database 114. In some examples, if there are no remaining webpages ("NO" branch of 408), connection string unit 210 may use web crawler system 212 to perform web scraping again to identify additional webpages.

On the other hand, if there are one or more remaining webpages ("YES" branch of 408), connection string unit 210 may prepare a trial connection string based on a format of connection string in highest ranked remaining webpage (412). Connection string unit 210 may then attempt to connect to target database 114 using the trial connection string (414). Attempting to connect to target database 114 using the trial connection string may involve sending the trial connection string to server system 104. Server system 104 may be identified in user input received from the user.

Connection string unit 210 may determine whether the attempt to connect to target database 114 was successful (416). For example, connection string unit 210 may receive a message from server system 104 indicating whether the attempt to connection to target database 114 was successful. If connection string unit 210 determines that the attempt to connect to target database 114 was not successful ("NO" branch of 416), connection string unit 210 may prepare a new trial connection string based on the format of the next highest ranked remaining webpage (412). On the other hand, if connection string unit 210 determines that the attempt to connect to target database 114 was successful ("YES" branch of 416), connection string unit 210 may store the connection string format for future use with database management system 112 (418).

Figure 5:
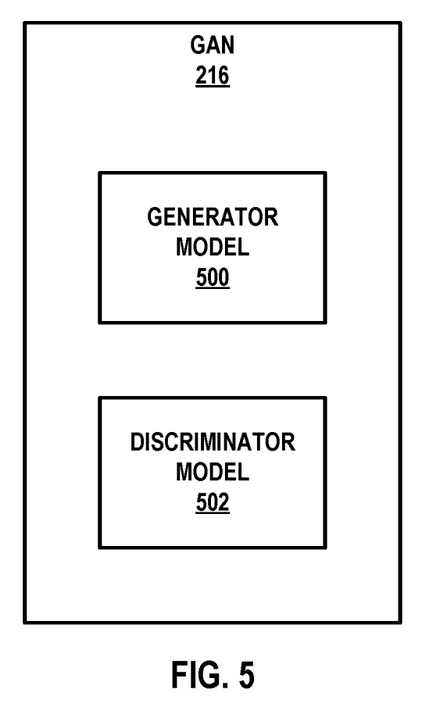
FIG. 5 is a block diagram illustrating an example generative adversarial network (GAN), in accordance with one or more aspects of this disclosure.

FIG. 5 is a block diagram illustrating an example GAN 216, in accordance with one or more aspects of this disclosure. In the example of FIG. 5, GAN 216 includes a generator model 500 and a discriminator model 502. Generator model 500 and discriminator model 502 are machine learning models. For instance, each of generator model 500 and discriminator model 502 may be implemented as separate neural network models.

In examples where generator model 500 is implemented as a neural network model, generator model 500 may include an input layer, one or more hidden layers, and an output layer. Each layer includes a set of neurons. In some examples, the layers of generator model 500 are fully connected layers. In some examples, generator model 500 includes one or more transpose convolutional layers. The output layer of generator model 500 may include an output neuron for each feature of a set of one or more features. Thus, the feature values produced by the output neurons of the output layer of generator model 500 may be a feature vector. Similarly, in examples where discriminator model 502 is implemented as a neural network model, discriminator model 502 may include an input layer, one or more hidden layers, and an output layer. In some examples, the layers of discriminator model 502 are fully connected layers. The output layer of discriminator model 502 may include an output neuron that generates a value that may indicate a level of confidence that a feature vector provided as input to discriminator model 502 was generated by generator model 500. In some examples, discriminator model 502 includes two convolutional layers. Each of the two convolutional layers has a set of filters, e.g., 64 filters, 128 filters, or another number of filters. In some examples, discriminator model 502 includes three convolutional layers, with, e.g., 64, 128, and 256 hidden nodes.

Data augmentation unit 214 may train generator model 500 and discriminator model 502. For example, data augmentation unit 214 may provide random data to the input neurons of generator model 500 and perform a feed forward process on generator model 500 to generate a feature vector. Data augmentation unit 214 may then provide the feature vector to discriminator model 502 and perform a feed forward process on discriminator model 502 to generate a value indicating a level of confidence that generator model 500 generated the feature vector. Data augmentation unit 214 may also provide real feature vectors (e.g., feature vectors representing a ground truth) and perform the feed forward process on discriminator model 502 to generate values indicating levels of confidence that generator model 500 generated the feature vectors. In some examples, the real feature vectors may include predefined feature vectors already populated into feature store 116. Data augmentation unit 214 may determine an error value as a cross-entropy loss value. If the value generated by discriminator model 502 indicates that the feature vector was generated by generator model 500 but the feature vector was not generated by generator model 500, data augmentation unit 214 may use the error value in a backpropagation process that updates weights of neurons of discriminator model 502. If the value generated by discriminator model 502 indicates that the feature vector was generated by generator model 500 and the feature vector was generated by generator model 500, data augmentation unit 214 may use the error value in a backpropagation process that updates weights of neurons of generator model 500. If the value generated by discriminator model 502 indicates that the feature vector was not generated by generator model 500 but the feature vector was generated by generator model 500, data augmentation unit 214 may use the error value in a backpropagation process that updates weights of neurons of discriminator model 502.

After data augmentation unit 214 has completed training of GAN 216, data augmentation unit 214 may use generator model 500 to generate synthetic feature vectors. For example, data augmentation unit 214 may provide random input to the input layer of generator model 500 and perform a feedforward process to generate a synthetic feature vector. Data augmentation unit 214 may then insert the feature values in the synthetic feature vector into feature store 116. For instance, data augmentation unit 214 may send commands to database management system 112 to store the feature values in the synthetic feature vector in feature store 116.

Figure 6:
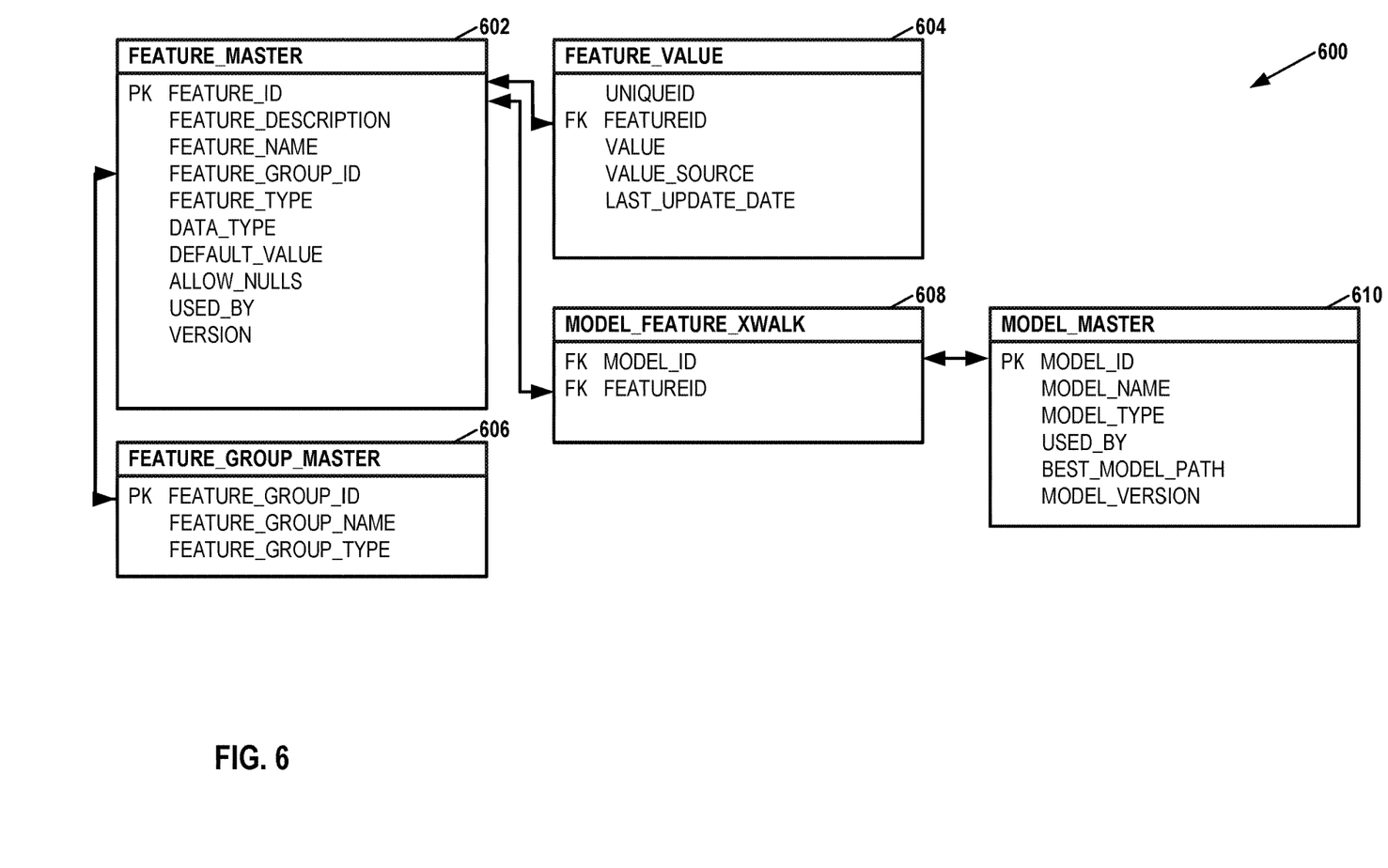
FIG. 6 is a conceptual diagram illustrating an example feature store schema for a relational database, in accordance with one or more aspects of this disclosure.

FIG. 6 is a conceptual diagram illustrating an example feature store schema 600 for a relational database, in accordance with one or more aspects of this disclosure. In the example of FIG. 6, feature store schema 600 includes a feature master table 602, a feature value table 604, a feature group master table 606, a model feature xwalk table 608, and a model master table 610. Each respective record in feature master table 602 includes information describing a respective feature, such as an identifier of the respective feature (FEATURE_ID), a description of the respective feature (FEATURE_DESCRIPTION), a name of respective feature (FEATURE_NAME), a group identifier of a feature group to which the respective feature belongs (FEATURE_GROUP_ID), a type identifier of the respective feature (FEATURE_TYPE), a data type of the respective feature (FEATURE_TYPE), a default value of feature values of the respective feature (DEFAULT_VALUE), whether the respective feature allows null as a feature value (ALLOW_NULLS), and so on.

Furthermore, each respective record in feature value table 604 corresponds to a respective feature value. In the example of FIG. 6, a record in feature value table 604 includes data indicating a unique identifier of the feature value (UNIQUEID), a feature identifier of feature of the feature value (FEATURED), a value of the feature value (VALUE), a source of the feature value (VALUE_SOURCE), and a date on which the feature value was last updated (LAST_UPDATE_DATE). The feature identifier of a record in feature value table 604 matches a feature identifier in feature master table 602. Thus, when generating the structure of the feature store, FSCS 102 may generate a feature master table 602 and feature value table 604 in target database 114. Each record in feature master table 602 may contain information defining a feature of the feature store. Each record in feature value table 604 may include a feature identifier of a record in feature master table 602 and a feature value of a feature defined by an applicable record in the feature master table. The applicable record in the feature master table is the record in feature master table 602 indicated by the feature identifier of the record in feature value table 604.

Feature group master table 606 includes data regarding groups of features. For instance, in the example of FIG. 6, feature group master table 606 includes a feature group identifier (FEATURE_GROUP_ID), a feature group name (FEATURE_GROUP_NAME), and a feature group type (FEATURE_GROUP_TYPE). Model master table 610 may store information regarding models of feature store 116. Model feature xwalk table 608 may store information regarding the features which each model is using.

Figure 7:
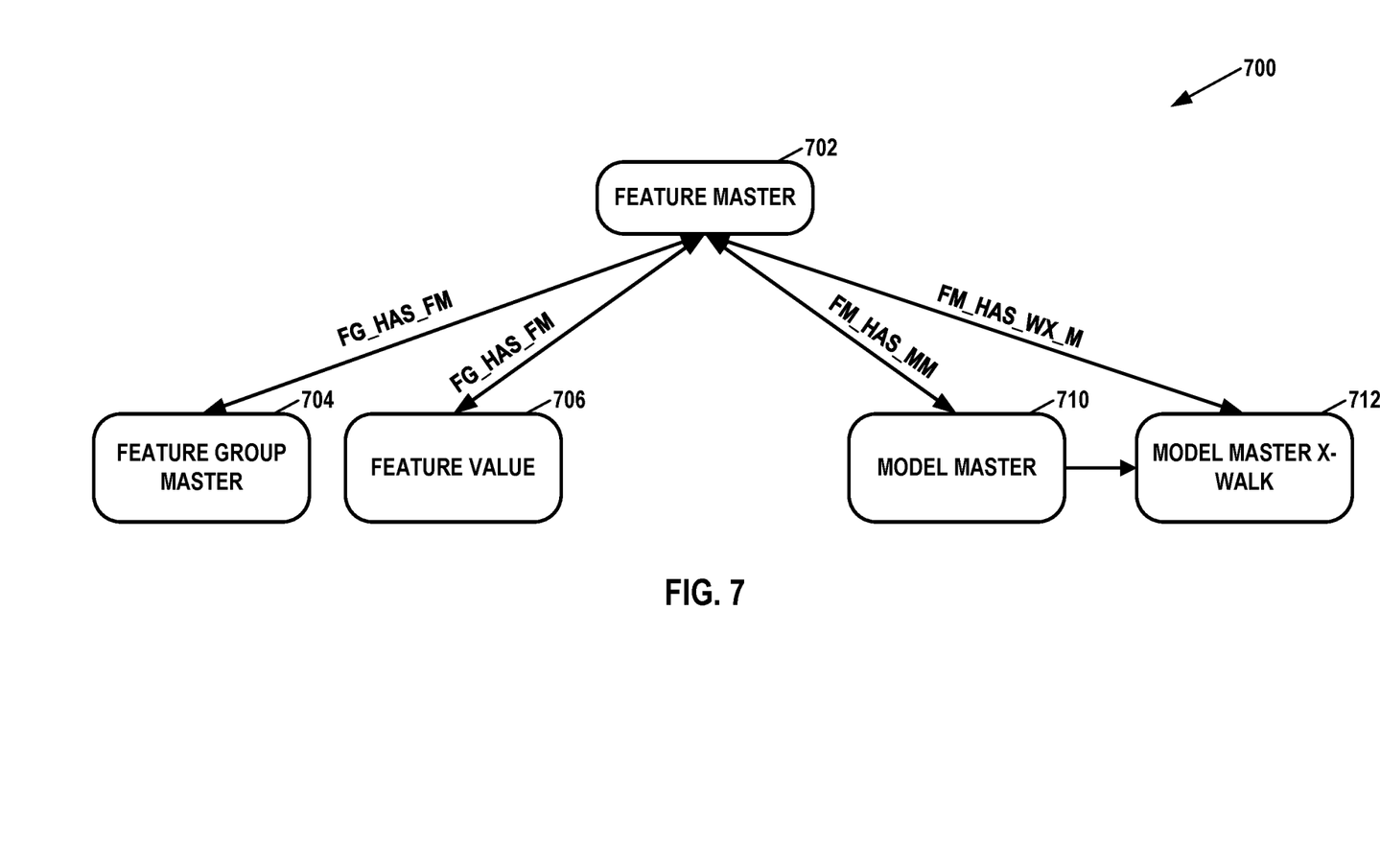
FIG. 7 is a conceptual diagram illustrating an example feature store schema for a graph database, in accordance with one or more aspects of this disclosure.

FIG. 7 is a conceptual diagram illustrating an example feature store schema 700 for a graph database, in accordance with one or more aspects of this disclosure. In the example of FIG. 7, feature store schema 700 defines a feature master node 702, a feature group master node 704, a feature value node 706, a model master node 710, and a model master x-walk node 712. Each feature master node 702, feature group master node 704, feature value node 706, model master node 710, and model master x-walk node 712 may include the data for a row of in feature master table 602, feature group master table 606, feature value table 604, model master table 610, and model feature xwalk table 608, respectively. Feature store 116 may include a feature master node for each feature. Feature store 116 may include multiple feature value nodes. Each of the feature nodes has an edge that is connected to a corresponding feature master node.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

The following paragraphs provide a non-limiting list of examples in accordance with techniques of this disclosure.

Example 1: A method for generating a feature store includes receiving, by processing circuitry of a computing system, an indication of user input, the indication of the user input indicating both a database management system and a server system, the server system hosting a target database; and in response to receiving the indication of user input: determining, by the processing circuitry, a connection string for the target database; connecting, by the processing circuitry, to the target database via the database management system using the connection string; after connecting to the target database, generating, by the processing circuitry, a structure of the feature store in the target database; and populating, by the processing circuitry, the feature store with predefined feature values.

Example 2: The method of example 1, wherein determining the connection string for the target database comprises: scraping, by the processing circuitry, webpages for connection strings for databases managed by the database management system; extracting, by the processing circuitry, database type details from Uniform Resource Locators (URLs) of the webpages; preparing, by the processing circuitry, a trial connection string based on a format of a webpage, wherein the webpage is one of the webpages; performing, by the processing circuitry, an attempt to use the trial connection string to connect to the target database; and based on the attempt to use the trial connection string to connect to the target database being unsuccessful, performing, by the processing circuitry, an attempt to use another connection string to connect to the target database.

Example 3: The method of example 2, wherein the webpage is a first webpage, the trial connection string is a first trial connection string, and determining the connection string for the target database further comprises: preparing, by the processing circuitry, a second trial connection string based on a format of a second webpage, wherein the second webpage is one of the webpages, and wherein the second trial connection string is the other connection string; performing, by the processing circuitry, an attempt to use the second trial connection string to connect to the target database; and based on the attempt to use the second trial connection string to connect to the target database being successful, determining, by the processing circuitry, that the second trial connection string is the connection string for the target database.

Example 4: The method of any of examples 2 and 3, wherein determining the connection string for the target database further comprises: ranking, by the processing circuitry, the webpages based on a set of predefined criteria.

Example 5: The method of any of examples 1 through 4, further includes applying, by the processing circuitry, a generator model to generate synthetic feature values, wherein the generator model is trained using a generative adversarial network; and populating, by the processing circuitry, the synthetic feature values into the feature store.

Example 6: The method of any of examples 1 through 5, wherein generating the structure of the feature store comprises generating a feature master table and a feature value table in the target database, wherein: each record in the feature master table contains information defining a feature of the feature store, and each record in the feature value table includes a feature identifier of a record in the feature master table and a feature value of a feature defined by an applicable record in the feature master table, the applicable record in the feature master table being the record in the feature master table indicated by the feature identifier of the record in the feature value table.

Example 7: The method of any of examples 1 through 5, wherein the target database is a graph database.

Example 8: The method of example 7, wherein: generating the structure of the feature store comprises adding, by the processing circuitry, feature master nodes to the graph database, each of the feature master nodes containing information defining a feature of the feature store; and populating the feature store with the predefined feature values comprises adding, by the processing circuitry, feature value nodes to the feature store and edges that connect the feature value nodes to the feature master nodes, wherein each of the feature value nodes contains information defining a feature value of the predefined feature values.

Example 9: The method of any of examples 1 through 8, wherein: the method further comprises receiving, by the processing circuitry, an indication of user input indicating user credentials for the target database, and connecting to the target database comprises providing, by the processing circuitry, the user credentials to the database management system.

Example 10: The method of any of examples 1 through 9, further comprising training a machine learning model based on features in the feature store.

Example 11: A system includes a target database; and a computing system includes receive an indication of user input, the indication of user input indicating both a database management system and a server system, the server system hosting the target database; and in response to receiving the indication of user input: determine a connection string for the target database; connect to the target database via the database management system using the connection string; after connecting to the target database, generate a structure of a feature store in the target database; and populate the feature store with predefined feature values.

Example 12: The system of example 11, wherein the processing circuitry is configured to, as part of determining the connection string for the target database: scrape webpages for connection strings for databases managed by the database management system; extract database type details from Uniform Resource Locators (URLs) of the webpages; prepare a trial connection string based on a format of a webpage, wherein the webpage is one of the webpages; perform an attempt to use the trial connection string to connect to the target database; and based on the attempt to use the trial connection string to connect to the target database being unsuccessful, perform an attempt to use another connection string to connect to the target database.

Example 13: The system of example 12, wherein the webpage is a first webpage, the trial connection string is a first trial connection string, and the processing circuitry is configured to, as part of determining the connection string for the target database: prepare a second trial connection string based on a format of a second webpage, wherein the second webpage is one of the webpages, and wherein the second trial connection string is the other connection string; perform an attempt to use the second trial connection string to connect to the target database; and based on the attempt to use the second trial connection string to connect to the target database being successful, determine that the second trial connection string is the connection string for the target database.

Example 14: The system of any of examples 12 and 13, wherein the processing circuitry is configured to, as part of determining the connection string for the target database, rank the webpages based on a set of predefined criteria.

Example 15: The system of any of examples 11 through 14, wherein the processing circuitry is further configured to: apply a generator model to generate synthetic feature values, wherein the generator model is trained using a generative adversarial network; and populate the synthetic feature values into the feature store.

Example 16: The system of any of examples 11 through 15, wherein the processing circuitry is configured to, as part of generating the structure of the feature store, generate a feature master table and a feature value table in the target database, wherein: each record in the feature master table contains information defining a feature of the feature store, and each record in the feature value table includes a feature identifier of a record in the feature master table and a feature value of a feature defined by an applicable record in the feature master table, the applicable record in the feature master table being the record in the feature master table indicated by the feature identifier of the record in the feature value table.

Example 17: The system of any of examples 11 through 15, wherein the target database is a graph database.

Example 18: The system of example 17, wherein: the processing circuitry is configured to, as part of generating the structure of the feature store, add feature master nodes to the graph database, each of the feature master nodes containing information defining a feature of the feature store; and the processing circuitry is configured to, as part of populating the feature store with the predefined feature values, add feature value nodes to the feature store and edges that connect the feature value nodes to the feature master nodes, wherein each of the feature value nodes contains information defining a feature value of the predefined feature values.

Example 19: The system of any of examples 11 through 18, wherein: the processing circuitry is further configured to receive an indication of user input indicating user credentials for the target database, and the processing circuitry is configured to, as part of connecting to the target database, provide the user credentials to the database management system.

Example 20: A non-transitory computer-readable storage medium having instructions stored thereon that, when executed, cause processing circuitry to: receive an indication of user input, the indication of the user input indicating both a database management system and a server system, the server system hosting a target database; and in response to receiving the indication of user input: determine a connection string for the target database; connect to the target database via the database management system using the connection string; after connecting to the target database, generate a structure of a feature store in the target database; and populate the feature store with predefined feature values.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for generating a feature store, the method comprising:
   receiving, by processing circuitry of a computing system, an indication of user input, the indication of the user input indicating both a database management system and a server system, the server system hosting a target database; and
   in response to receiving the indication of user input:
      determining, by the processing circuitry, a connection string for the target database;
      connecting, by the processing circuitry, to the target database via the database management system using the connection string;
      after connecting to the target database, generating, by the processing circuitry, a structure of the feature store in the target database, wherein generating the structure of the feature store comprises generating a feature master table in the target database and a feature value table in the target database, wherein:
         each record in the feature master table contains information defining a feature of the feature store, and
         each record in the feature value table includes a feature identifier of a record in the feature master table and a feature value of a feature defined by an applicable record in the feature master table, the applicable record in the feature master table being the record in the feature master table indicated by the feature identifier of the record in the feature value table; and
      populating, by the processing circuitry, the feature store with predefined feature values.

2. The method of claim 1, wherein determining the connection string for the target database comprises:
   scraping, by the processing circuitry, webpages for connection strings for databases managed by the database management system;
   extracting, by the processing circuitry, database type details from Uniform Resource Locators (URLs) of the webpages;
   preparing, by the processing circuitry, a trial connection string based on a format of a webpage, wherein the webpage is one of the webpages;
   performing, by the processing circuitry, an attempt to use the trial connection string to connect to the target database; and
   based on the attempt to use the trial connection string to connect to the target database being unsuccessful, performing, by the processing circuitry, an attempt to use another connection string to connect to the target database.

3. The method of claim 2, wherein the webpage is a first webpage, the trial connection string is a first trial connection string, and determining the connection string for the target database further comprises:
   preparing, by the processing circuitry, a second trial connection string based on a format of a second webpage, wherein the second webpage is one of the webpages, and wherein the second trial connection string is the other connection string;

performing, by the processing circuitry, an attempt to use the second trial connection string to connect to the target database; and based on the attempt to use the second trial connection string to connect to the target database being successful, determining, by the processing circuitry, that the second trial connection string is the connection string for the target database.

4. The method of claim 2, wherein determining the connection string for the target database further comprises:
ranking, by the processing circuitry, the webpages based on a set of predefined criteria.

5. The method of claim 1, further comprising:
applying, by the processing circuitry, a generator model to generate synthetic feature values, wherein the generator model is trained using a generative adversarial network; and
populating, by the processing circuitry, the synthetic feature values into the feature store.

6. The method of claim 1, wherein:
the method further comprises receiving, by the processing circuitry, an indication of user input indicating user credentials for the target database, and
connecting to the target database comprises providing, by the processing circuitry, the user credentials to the database management system.

7. The method of claim 1, further comprising training a machine learning model based on features in the feature store.

8. A system comprising:
a target database; and
a computing system comprising processing circuitry, wherein the processing circuitry is configured to:
receive an indication of user input, the indication of user input indicating both a database management system and a server system, the server system hosting the target database; and
in response to receiving the indication of user input:
determine a connection string for the target database;
connect to the target database via the database management system using the connection string;
after connecting to the target database, generate a structure of a feature store in the target database, wherein the processing circuitry is configured to, as part generating the structure of the feature store, generate a feature master table in the target database and a feature value table in the target database, wherein:
each record in the feature master table contains information defining a feature of the feature store, and
each record in the feature value table includes a feature identifier of a record in the feature master table and a feature value of a feature defined by an applicable record in the feature master table, the applicable record in the feature master table being the record in the feature master table indicated by the feature identifier of the record in the feature value table; and
populate the feature store with predefined feature values.

9. The system of claim 8, wherein the processing circuitry is configured to, as part of determining the connection string for the target database:

scrape webpages for connection strings for databases managed by the database management system;
extract database type details from Uniform Resource Locators (URLs) of the webpages;
prepare a trial connection string based on a format of a webpage, wherein the webpage is one of the webpages;
perform an attempt to use the trial connection string to connect to the target database; and
based on the attempt to use the trial connection string to connect to the target database being unsuccessful, perform an attempt to use another connection string to connect to the target database.

10. The system of claim 9, wherein the webpage is a first webpage, the trial connection string is a first trial connection string, and the processing circuitry is configured to, as part of determining the connection string for the target database:
prepare a second trial connection string based on a format of a second webpage, wherein the second webpage is one of the webpages, and wherein the second trial connection string is the other connection string;
perform an attempt to use the second trial connection string to connect to the target database; and
based on the attempt to use the second trial connection string to connect to the target database being successful, determine that the second trial connection string is the connection string for the target database.

11. The system of claim 9, wherein the processing circuitry is configured to, as part of determining the connection string for the target database, rank the webpages based on a set of predefined criteria.

12. The system of claim 8, wherein the processing circuitry is further configured to:
apply a generator model to generate synthetic feature values, wherein the generator model is trained using a generative adversarial network; and
populate the synthetic feature values into the feature store.

13. The system of claim 8, wherein:
the processing circuitry is further configured to receive an indication of user input indicating user credentials for the target database, and
the processing circuitry is configured to, as part of connecting to the target database, provide the user credentials to the database management system.

14. A non-transitory computer-readable storage medium having instructions stored thereon that, when executed, cause processing circuitry to:
receive an indication of user input, the indication of the user input indicating both a database management system and a server system, the server system hosting a target database; and
in response to receiving the indication of user input:
determine a connection string for the target database;
connect to the target database via the database management system using the connection string;
after connecting to the target database, generate a structure of a feature store in the target database, wherein the instructions that cause the processing circuitry to generate the structure of the feature store comprises instructions that, when executed, cause the processing circuitry to generate a feature master table in the target database and a feature value table in the target database, wherein:
each record in the feature master table contains information defining a feature of the feature store, and
each record in the feature value table includes a feature identifier of a record in the feature master table and a feature value of a feature defined by an applicable record in the feature master table, the applicable record in the feature master table being the record in the feature master table indicated by the feature identifier of the record in the feature value table; and populate the feature store with predefined feature values.

* * * * *